United States Patent [19]

Gronholz

[11] 4,044,805
[45] Aug. 30, 1977

[54] ROUTER GUIDE UNIT

[76] Inventor: Donald D. Gronholz, 10941 Morris Ave. South, Bloomington, Minn. 55437

[21] Appl. No.: 655,278

[22] Filed: Feb. 4, 1976

[51] Int. Cl.² .............................................. B27C 5/10
[52] U.S. Cl. ................................ 144/134 D; 33/41 E; 33/42; 90/12 D; 144/136 C
[58] Field of Search .............. 33/42, 41 F, 41 E; 90/12 D, DIG. 3; 30/371, 289, 373; 144/1 R, 1 E, 1 F, 82, 83, 114 R, 117 R, 130, 134 R, 134 D, 134 A, 253, 136 R, 136 C

[56] References Cited

U.S. PATENT DOCUMENTS

| 1,833,230 | 11/1931 | Schneider | 33/42 |
| 1,993,132 | 3/1935 | Cathcard | 33/41 E |
| 2,287,601 | 6/1942 | Callaghan | 33/41 E |
| 2,943,654 | 7/1960 | Emmons | 144/134 D |
| 2,943,655 | 7/1960 | Pedersen et al. | 144/134 D X |
| 3,119,207 | 1/1964 | Nall | 144/134 D X |
| 3,635,268 | 1/1972 | Lange | 144/134 D |

FOREIGN PATENT DOCUMENTS 494,489  5/1954  Italy .................... 144/134 D

Primary Examiner—Othell M. Simpson
Assistant Examiner—W. D. Bray
Attorney, Agent, or Firm—Merchant, Gould, Smith, Edell, Welter & Schmidt

[57] ABSTRACT

An improved arrangement by which a router may be accurately and inexpensively used to trim the edge of a laminate overlay flush with the edge of the underlying wooden member. It particularly comprises a guide fence having a relatively long straight edge interrupted centrally by a recess for the router bit, and provided with a rabbet into which the projecting edge of a rough trimmed laminate may project early in the edging process. The fence cooperates with a sub-base attachable to a router, and retains the versatility of the router for many usual applications.

5 Claims, 8 Drawing Figures

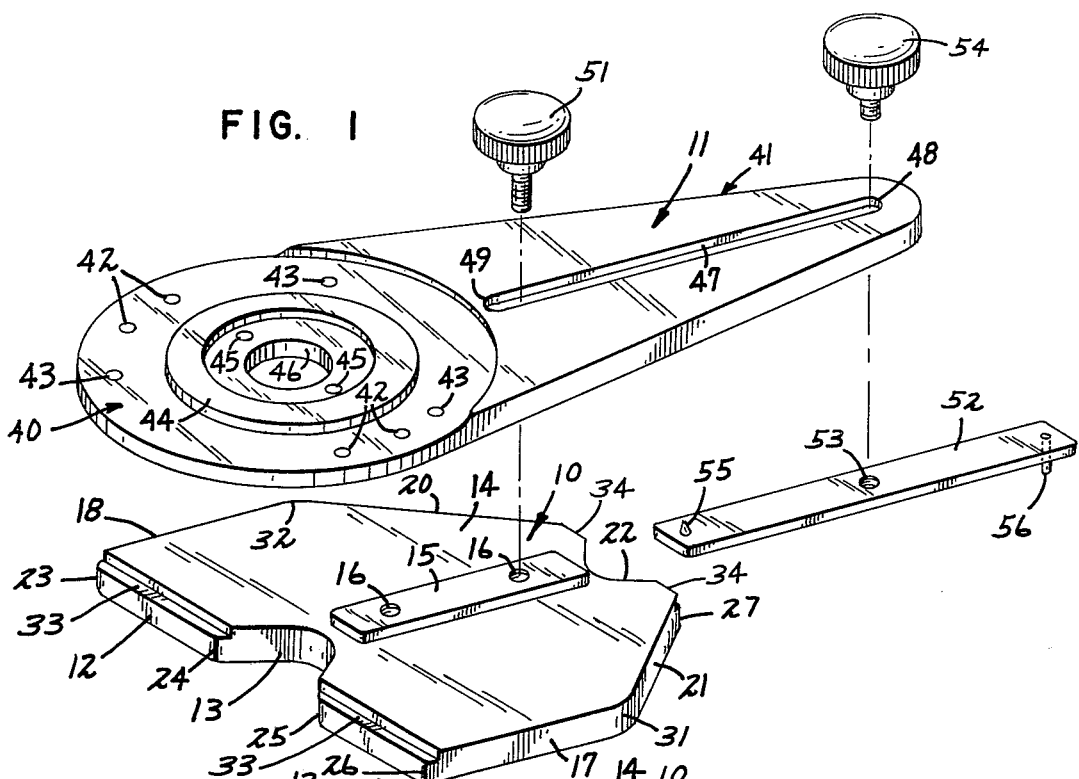
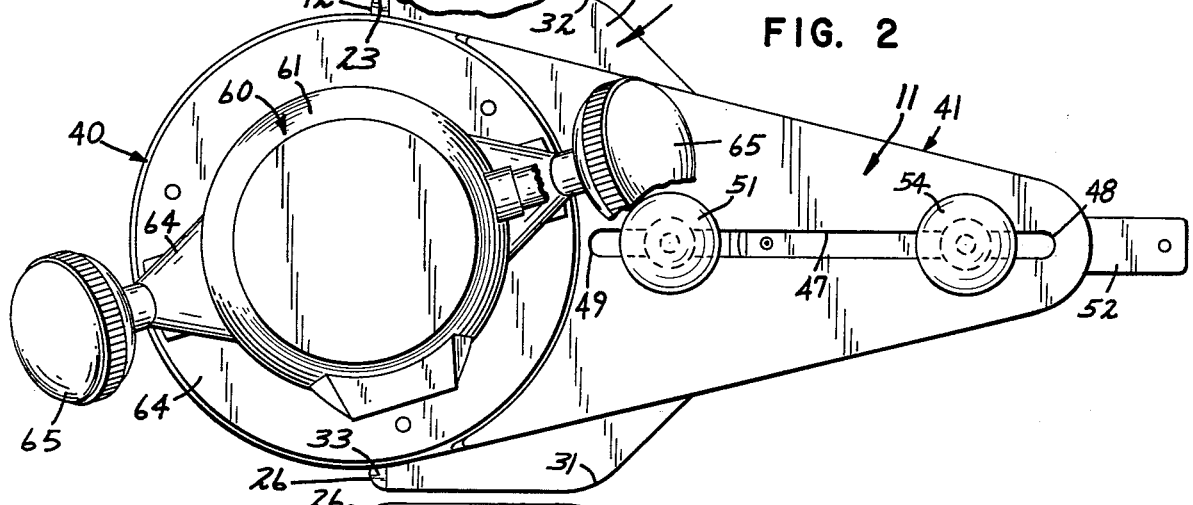
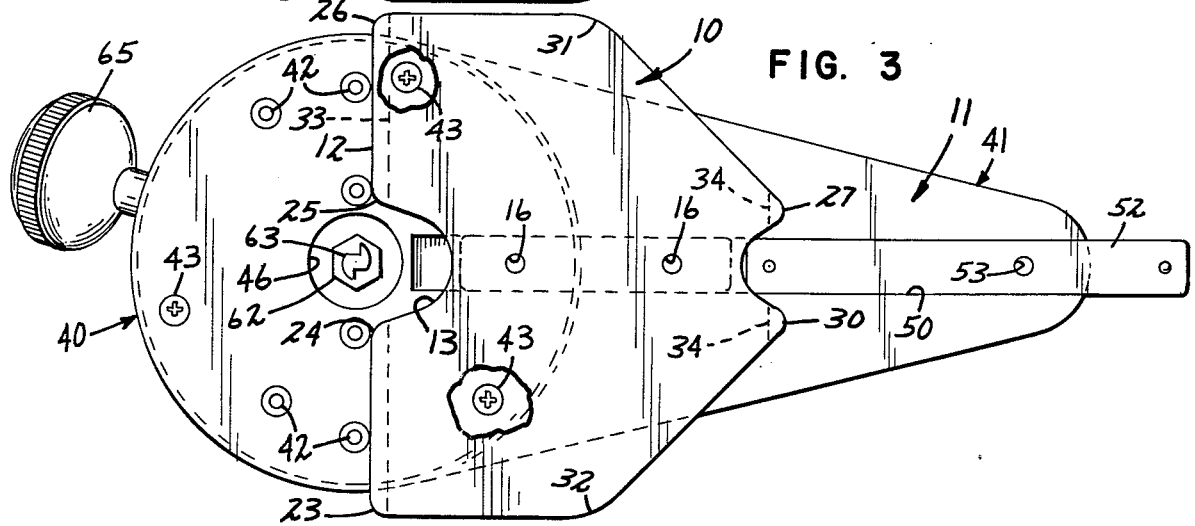

ROUTER GUIDE UNIT

BACKGROUND OF THE INVENTION

This invention relates to the field of practical mechanics, and specifically to an arrangement for facilitating the use of portable routers. A router of this sort comprises a high speed motor with a vertical shaft carrying at its lower end a chuck to receive the standard shank of any of a plurality of bits, and a handle base supporting the motor on the surface of a work piece and providing axial adjustment to determine the depth of the end of the bit below the work surface.

Such routers are in wide spread use and it is generally known that auxiliary means must be provided to assist the use in guiding the router with respect to the work. The base of the router, which may be substantially round, is not large enough to give a desirable off-set or displacement from the cutter axis for fences or guides secured directly thereto, and resort has been had to sub-bases or to transversely extending rods to support fences at a greater off-set for work on large surfaces Fences and guides of various sorts are known, and are described in the handbooks supplied to the purchasers of routers.

One of the uses for a portable router is to trim the edge of a overlay laminate even with the edge of a counter or other top to which it is adhered. A known way of doing this is by use of a special bit called a "flush trimmer" which carries at its free end a ball bearing pilot, of the same diameter as the bit itself, for contacting the edge of the top below the laminate and thus positioning the bit transversely to give the desired finished surface.

SUMMARY OF THE INVENTION

The present invention comprises a new and improved router guide fence and associated sub-base, and the combination of that fence and sub-base with a router to give a versatile arrangement especially useful in trimming laminate along both outside and inside straight edges, using simple cutter bits free from pilots and so on. The new fence remains useful for many other familiar router guidance operations. To accomplish these ends, the fence has a straight edge of considerable length, centrally interrupted by a recess of about the same size as the largest router bit to be used, and edged by a rabbet of predetermined width and of depth corresponding to the thickness of the laminate of interest. By means of a sub-base, the fence is adjustably connected to the base of the router, through one or more tongues and grooves carried by the sub-base and fence for mutual interaction. Preferably a single groove is formed in the lower surface of the sub-base for cooperation with a single tongue projecting upwardly from the top surface of the fence. The straight edge of the fence remains parallel to a selected diameter of the router base, and the fence is movable with respect to the sub-base under the guidance of the tongue and groove, which extend in a direction normal to the straight edge.

Various advantages and features of novelty which characterize my invention are pointed out with particularity in the claims annexed hereto and forming a part thereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWINGS

In the drawing,

FIG. 1 is an exploded view in perspective of my improved fence, trammel point, and the associated sub-base;

FIG. 2 is a top view of a router using my improved apparatus;

FIG. 3 is a bottom view of the apparatus of FIG. 2;

DESCRIPTION OF THE PREFERRED EMBODIMENT

Figure 4:
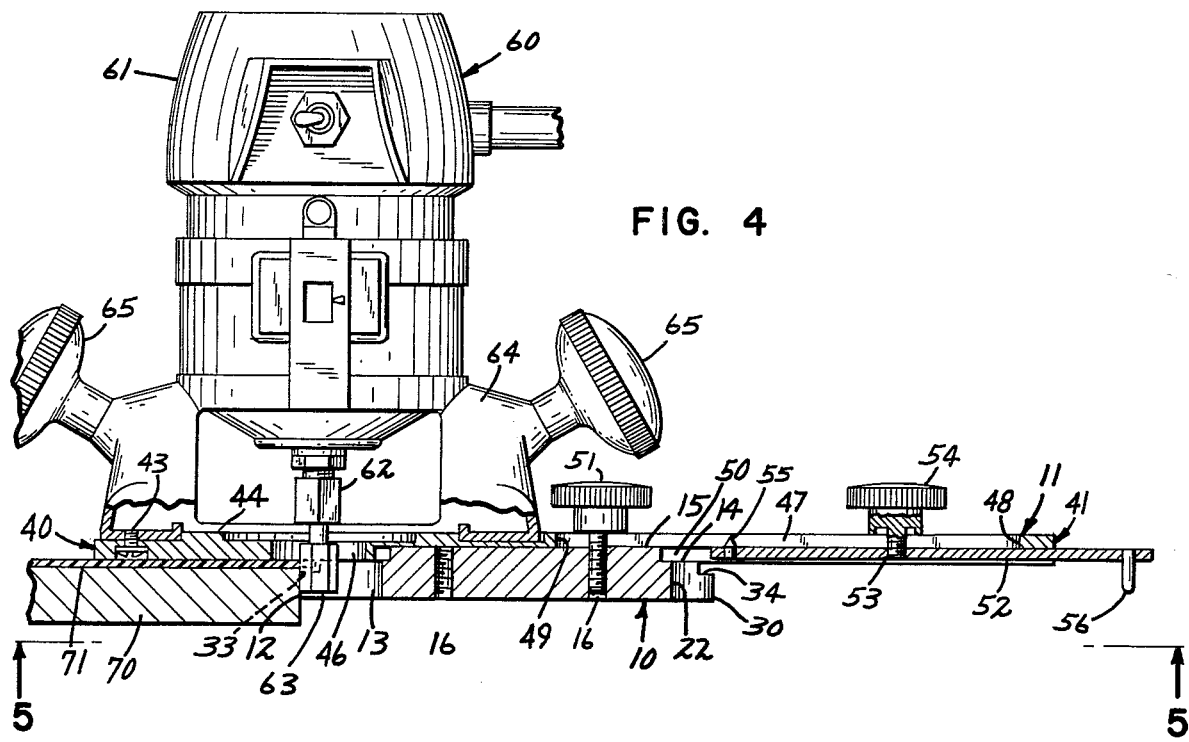
FIG. 4 is a side view of the apparatus of FIGS. 2 and 3, part being broken away and shown in section for clarity of illustration.

My invention is shown in FIG. 1 to comprise a flat fence 10 arranged for adjustable cooperation with a flat sub-base 11 adapted for securement to the base of a router.

Fence 10 is a flat member particularly characterized by having a straight edge 12 centrally interrupted by a recess 13. The width of recess 13 is only slightly greater than the diameter of the largest router bit to be used, and this width comprises a relatively small portion of the total length of straight edge 12: it is important for most satifactory use that the portions of edge 12 on each side of recess 13 be of significant length to give the router satisfactory stability when in use.

The upper surface 14 of fence 10 carries or includes a tongue 15 centered on a line perpendicular to the straight edge at the center of recess 13, and includes a plurality of threaded sockets or inserts 16 for increased latitude of adjustment. Fence 10 has further edges 17 and 18 which are conveniently at right angles to edge 12. Opposite straight edge 12, fence 10 is formed with a pair of edges 20 and 21 which are mutually perpendicular, the right angle being bisected by the perpendicular to edge 12 at its center. The vertex of the right angle is cut away to provide a second recess 22 of approximately the same width as the recess 13. The corners 23, 24, 25, 26, 27 and 30 are preferably rounded at a small radius, as best shown in FIG. 3, and the other corners 31 and 32 may also be rounded if desired.

Along edge 12, the upper surface 14 of fence 10 is provided with a rabbet 33, having a predetermined width, and a depth slightly greater than the thickness of standard overlay laminates. In one successful embodiment of the invention, the rabbet was a quarter of an inch wide and an eighth of an inch deep. The depth of rabbet 33 is not a major portion of the thickness of fence 10. Similar rabbets 34 are provided across corners 27 and 30.

Sub-base 11 is shown to comprise a seat portion 40 for securement to the base of a router and an arm portion 41 extending therefrom and defined by converging straight lines tangent thereto. Securement is by means such as screws passing through properly spaced holes 42, 43 positioned to line up with tapped holes in the router base. To illustrate versatility, holes 42 may be spaced to match a first router base, and holes 43 to match a second router base. For additional interfit with one standard router base, end 40 is reduced in thickness around a central boss 44 apertured at 45, and centrally secured if desired, for securement of guide bushings. A central aperture 46 is end 40 is of larger diameter than the largest bit to be used, and is positioned to be coaxial with the bit when the router is installed.

Portion 41 is provided with a through-slot 47 extending radially from the center of aperture 46 and closed at both its outer end 48 and its inner end 49. The under surface of sub-base 11 is provided with a groove 50 centered on, but wider than slot 47, the groove being open at its outer end and extending inwardly almost to aperture 46. The dimension of groove 50 agrees with those of tongue 15, so that smooth sliding movement of the fence with respect to the sub-base in the direction of slot 47 is possible.

By reason of the placement of tongue 15, fence 10 may be orientated in either of two positions with respect to sub-base 11: either recess 13 or recess 22 may be adjacent to aperture 46. A thumb screw 51 is provided to traverse slot 47 and engage either of fasteners 16 to fix the position of the fence with respect to the sub-base and hence with respect to the axis of the router bit.

To provide full versatility in the structure, a plate 52 is provided, dimensioned for a sliding fit in groove 50. Plate 52 is centrally apertured at 53 to receive a second /thumb screw 54 passing through slot 47. At one end of plate 52 there is provided a center pin 55 extending from one surface of the plate in a first direction, and at the other end of plate 52 there is a trammel point 56 extending from the other surface of the plate in the other direction. While both fence 10 and plate 52 may be received in groove 50 at the same time for storage, it will be appreciated that either can be removed at will to extend the freedom of use of the other.

FIGS. 2–4 show the apparatus in combination with a router 60 comprising a power unit 61 equipped with a chuck 62 to grip the standard shank of a router bit 63, and carried in a mounting shoe or base 64 having handles 65 for ease in manipulation. Conventional means, not shown, are provided to allow axial adjustment of the power unit, and hence the bit, with respect to the base, through which the latter may project for peripheral engagement with a work piece.

Figure 5:
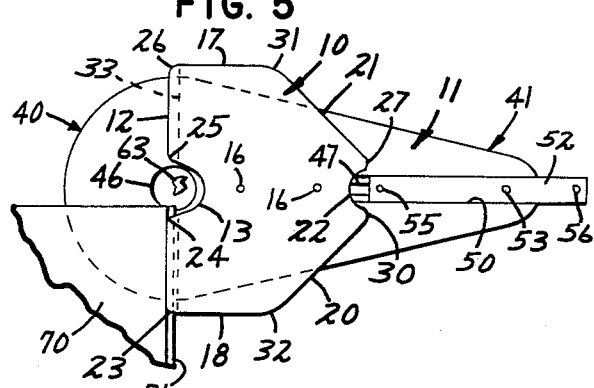
FIG. 5 is a schematic fragmentary view to a smaller scale, seen in the direction of line 5—5 of FIG. 4, showing the apparatus in use.

FIG. 5 is a bottom view of the arrangement in use for trimming a laminate. As shown in this figure and FIG. 4, a counter top is shown at 70, to which an overlay laminate 71 is adhesively secured. Initially the overlay is roughly trimmed to have a maximum overhang, beyond the edge of the top, of less than the width of rabbet 33. A bit 63 of desired diameter is gripped in chuck 62. Thumb screw 54 and plate 52 may be removed if desired. Thumb screw 51 is loosened and fence 10 is adjusted in groove 50 until the straight edge 12 is tangent with the bit 63 in such a way that the entire bit is contained within recess 13. The bit is adjusted axially to extend below the surfase of sub-base 11 at least as much as the thickness of the laminate.

The assembly is now lowered over the top surface of the overlay, with straight edge 12 generally parallel to the edge of the overlay, and moved in an inward direction until bit 63 cuts the overlay and edge 12 engages the top to which the overlay is adhered. Portions of the overlay project into rabbet 33 on both sides of the bit. The apparatus is now slid along the work piece, edge 12 being retained in engagement with the edge of the work piece under the overlay. A smooth flush trim cut results.

The trimming cut can begin at a corner, if desired, rather than at an intermediate point. This is shown in FIG. 5, the work being seen from below. It is to be particularly noted that the portion of straight edge 12 below the bit in this figure is long enough to give a firm and steady support to the router even before it reaches the work piece.

Figure 6:
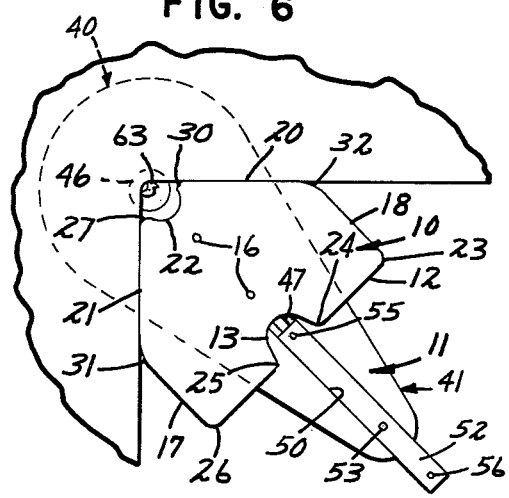
FIGS. 6, 7 and 8 are views similar to FIG. 5 showing uses of the apparatus.
Figure 7:
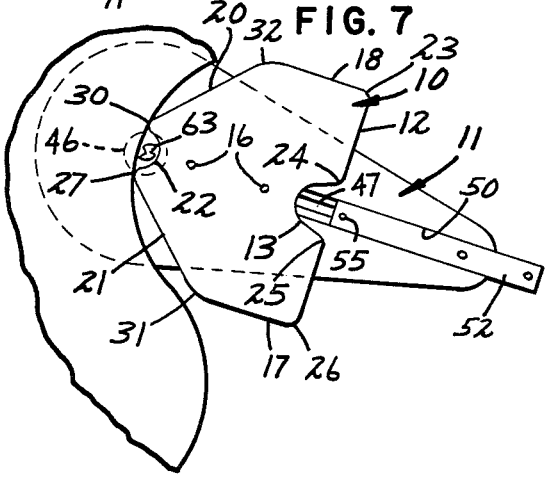
Figure 8:
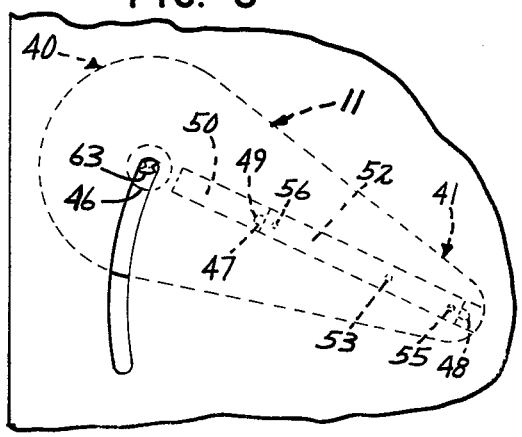

FIGS. 6, 7 and 8 are presented to show that the versatility of the arrangement is not impaired by the improved structure. FIG. 6 shows the router being used to complete the edging of an internal angle, and FIG. 7 shows the router being used to edge a curvilinear surface. Since corners 27 and 30 are rabbeted, it is possible to trim a laminate along a curvilinear line as well as a straight line. The use of trannel point 56 to follow patterns, and of center point 55 to describe circles, are standard, the latter being suggested in FIG. 8.

From the foregoing it will be evident that I have invented an improved arrangement for use with power routers, which has special advantages for the use in edging laminates flush with the underlying wooden members, without losing the versatility of such arrangements for other applications.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. In combination:
   a router having a flat base with a central aperture through which a selected router bit may project axially for peripheral engagement with the edge of a work piece;
   a guide fence, having first and second flat faces, to be secured with respect to the router base with the first face of the fence turned toward the router, said fence including a straight edge having a length of the base, said edge being centrally interrupted by a recess of a width substantially the same as the diameter of the largest bit to be used;
   adjustable means for securing said fence flat against said router base, with said straight edge parallel to a line passing perpendicularly through the axis of the bit, said adjustable means enabling adjustment of said fence in a direction perpendicular to said straight edge, said adjustable means comprising a sub-base having a first face secured against said router base and having a second base remote from said router base including a groove extending radially with respect to the axis of said center aperture, and said fence including a tongue projecting from said first surface thereof and aligned with said direction of adjustment, and means adjustable along said groove independently of said fence and including at least one trammel point.

2. In combination:
   a router having a flat base with a center aperture through which a selected router bit may project axially for peripheral engagement with the edge of a work piece to trim the edge of an overlay laminate flush with the edge of an underlying member;

a flat guide fence to be secured with respect to said base with one face of the fence turned toward the router, said fence including a straight edge having a length of the same order of magnitude as a transverse dimension of said base, said edge having a rabbet extending along said one face, of selected width and of depth no less than the thickness of the overlay laminate;

and means securing said fence flat against said base with said straight edge parallel to a line passing perpendicularly through the axis of the bit, for adjustment in a direction perpendicular to said straight edge to a position spaced from said axis by the radius of the bit.

3. The structure of claim 2 in which said straight edge is centrally interrupted by a recess of a width substantially the same as the diameter of the largest bit to be used.

4. A router guide fence of flat material having a first face to be directed toward the router, said fence including:

a straight edge centrally interrupted by a recess of a width sbstantially the same as the diameter of the largest bit to be used, said edge further having a rabbet extending along said one face, of selected with and depth;

and adustable means for use in securing said fence with respect to a router, including at least one tongue and one groove extending perpendicular to said straight edge.

5. A router guide assembly particularly useful in trimming the edge of an overlay laminate flush with the edge of an underlying member comprising a flat sub-base, a flat guide fence, and adjustable means connecting said fence to said sub-base;

said sub-base including means for use in securing the same to the base of a router and having a central aperture to be traversed axially by a selected bit in the router;

said fence having a first face to be directed toward the sub-base, and including a straight edge centrally interrupted by a recess of width substantially the same as the diameter of the largest router bit to be used, said edge further having a rabbet extending along said one face, of selected width and of depth no less than the thickness of the overlay laminate;

and said adjustable means including at least one tongue and one groove extending perpendicular to said straight edge.

* * * * *